US012586864B2

(12) United States Patent
Kim et al.

(10) Patent No.: US 12,586,864 B2
(45) Date of Patent: Mar. 24, 2026

(54) BATTERY PACK INCLUDING THERMAL SPREAD INHIBITION STRUCTURE

(71) Applicant: LG ENERGY SOLUTION, LTD., Seoul (KR)

(72) Inventors: Kyung Woo Kim, Daejeon (KR); Young Bum Cho, Daejeon (KR); Jeong Oh Moon, Daejeon (KR); Hyeon Ki Yun, Daejeon (KR); Eun Gyu Shin, Daejeon (KR); Ho June Chi, Daejeon (KR); Jin Yong Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 648 days.

(21) Appl. No.: 18/011,656

(22) PCT Filed: Nov. 16, 2021

(86) PCT No.: PCT/KR2021/016707
§ 371 (c)(1),
(2) Date: Dec. 20, 2022

(87) PCT Pub. No.: WO2022/108290
PCT Pub. Date: May 27, 2022

(65) Prior Publication Data
US 2023/0335856 A1     Oct. 19, 2023

(30) Foreign Application Priority Data
Nov. 23, 2020     (KR) ........................ 10-2020-0157821

(51) Int. Cl.
H01M 50/383     (2021.01)
H01M 10/613     (2014.01)
(Continued)

(52) U.S. Cl.
CPC ....... H01M 50/383 (2021.01); H01M 10/613 (2015.04); H01M 10/6556 (2015.04);
(Continued)

(58) Field of Classification Search
CPC ............. H01M 10/613; H01M 10/625; H01M 10/647; H01M 10/6551; H01M 10/6554;
(Continued)

(56) References Cited

U.S. PATENT DOCUMENTS

2008/0248379 A1     10/2008     Takeuchi et al.
2011/0005781 A1     1/2011     Yasui et al.
(Continued)

FOREIGN PATENT DOCUMENTS

JP     2008-258027 A     10/2000
JP     2009-219257 A     9/2009
(Continued)

OTHER PUBLICATIONS

Machine translation of KR20200001705 (cited on IDS) (Year: 2020).*
(Continued)

*Primary Examiner* — Eugenia Wang
(74) *Attorney, Agent, or Firm* — Birch, Stewart, Kolasch & Birch, LLP

(57)     ABSTRACT

A battery pack includes a battery module configured to receive a plurality of battery cells, a battery pack case configured to receive two or more battery modules, and a heat sink located under the battery modules, wherein each of the battery modules includes a plurality of battery cells, a water tank located above the plurality of battery cells, and a module case configured to receive the plurality of battery cells and the water tank. When fire breaks out in the battery cell, it is possible to rapidly and accurately prevent spread of flames of the ignited battery cell.

14 Claims, 5 Drawing Sheets

(51) Int. Cl.

| | |
|---|---|
| *H01M 10/6556* | (2014.01) |
| *H01M 10/6567* | (2014.01) |
| *H01M 10/6568* | (2014.01) |
| *H01M 50/209* | (2021.01) |
| *H01M 50/609* | (2021.01) |

(52) U.S. Cl.
   CPC ... *H01M 10/6567* (2015.04); *H01M 10/6568* (2015.04); *H01M 50/209* (2021.01); *H01M 50/609* (2021.01); *H01M 2200/10* (2013.01)

(58) Field of Classification Search
   CPC .......... H01M 10/6556; H01M 10/658; H01M 50/211; H01M 50/262; H01M 50/271; H01M 50/291; H01M 50/293; H01M 50/609; H01M 50/383; H01M 50/209; H01M 50/636; H01M 10/6567; H01M 10/6568; H01M 2200/10; Y02E 60/10; A62C 3/07; A62C 3/16; A62C 35/10
   See application file for complete search history.

(56) References Cited

U.S. PATENT DOCUMENTS

| | | | |
|---|---|---|---|
| 2013/0011701 | A1 | 1/2013 | Petzinger |
| 2013/0075116 | A1 | 3/2013 | Lim et al. |
| 2014/0170447 | A1 | 6/2014 | Woehrle et al. |
| 2016/0315361 | A1 | 10/2016 | Petzinger |
| 2019/0305391 | A1 | 10/2019 | Petzinger |
| 2019/0312322 | A1 | 10/2019 | Ahn et al. |
| 2019/0334143 | A1 | 10/2019 | Sugeno |
| 2020/0388805 | A1 | 12/2020 | Yoo et al. |
| 2021/0050635 | A1 | 2/2021 | Lee et al. |
| 2021/0313633 | A1 | 10/2021 | Petzinger |
| 2022/0140428 | A1 | 5/2022 | Chi et al. |

FOREIGN PATENT DOCUMENTS

| | | | |
|---|---|---|---|
| JP | 2010-97836 | A | 4/2010 |
| JP | 2012-252909 | A | 12/2012 |
| JP | 2014-523622 | A | 9/2014 |
| JP | 5760713 | B2 | 8/2015 |
| JP | 2019-29245 | A | 2/2019 |
| JP | 2019-46748 | A | 3/2019 |
| KR | 10-2013-0078953 | A | 7/2013 |
| KR | 10-1294169 | B1 | 8/2013 |
| KR | 10-2014-0005323 | A | 1/2014 |
| KR | 10-2018-0038310 | A | 4/2018 |
| KR | 10-2020-0030964 | A | 3/2020 |
| KR | 10-2020-0036640 | A | 4/2020 |
| KR | 10-2020-0104005 | A | 9/2020 |
| WO | WO 2018/131221 | A1 | 7/2018 |
| WO | WO 2020/190062 | A1 | 9/2020 |

OTHER PUBLICATIONS

International Search Report (PCT/ISA/210) issued in PCT/KR2021/016707, dated Mar. 2, 2022.

Extended European Search Report for European Application No. 21895058.2, dated Jul. 15, 2024.

* cited by examiner

【FIG. 1】
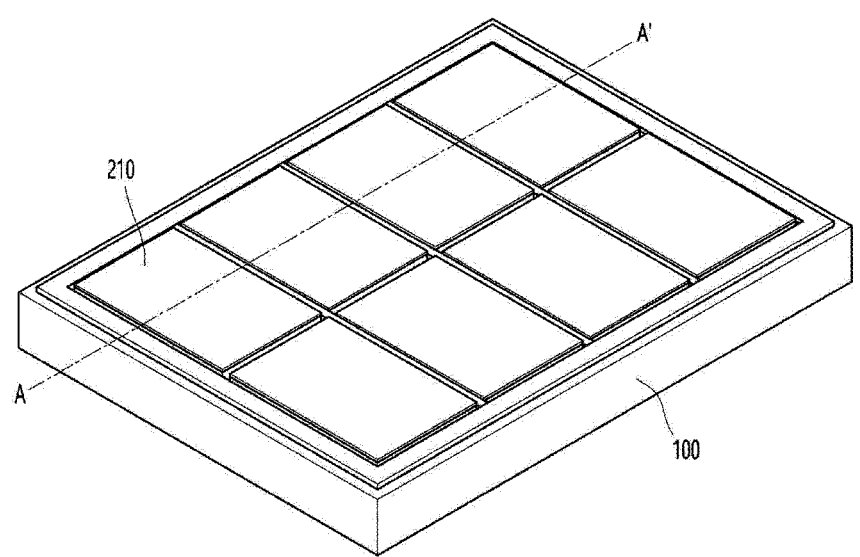
【FIG. 2】
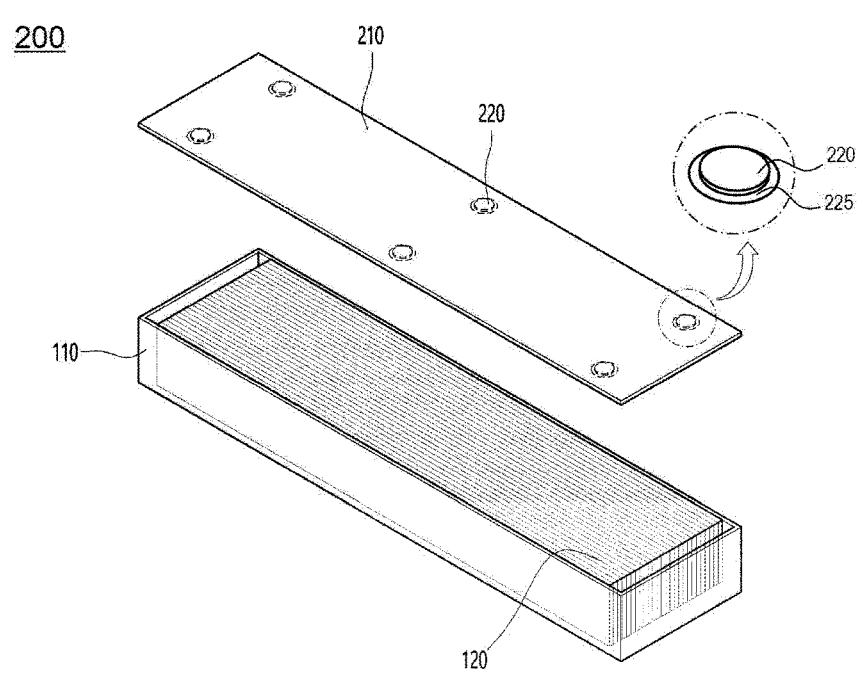

【FIG. 3】
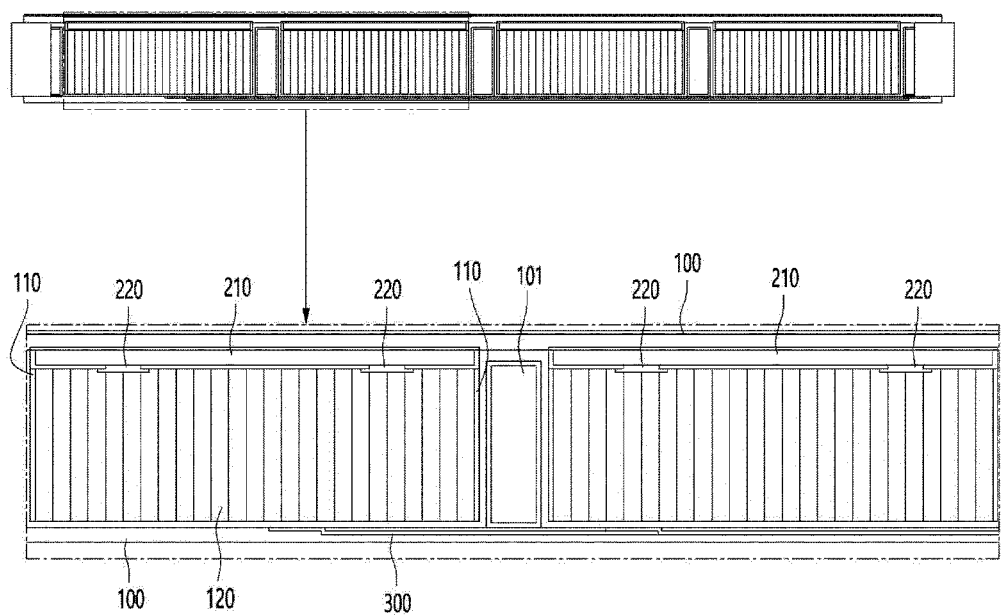
【FIG. 4】
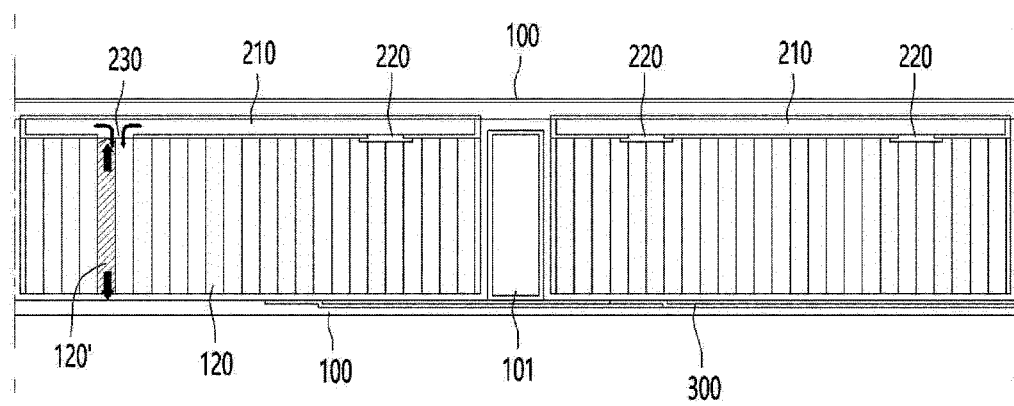

【FIG. 5】
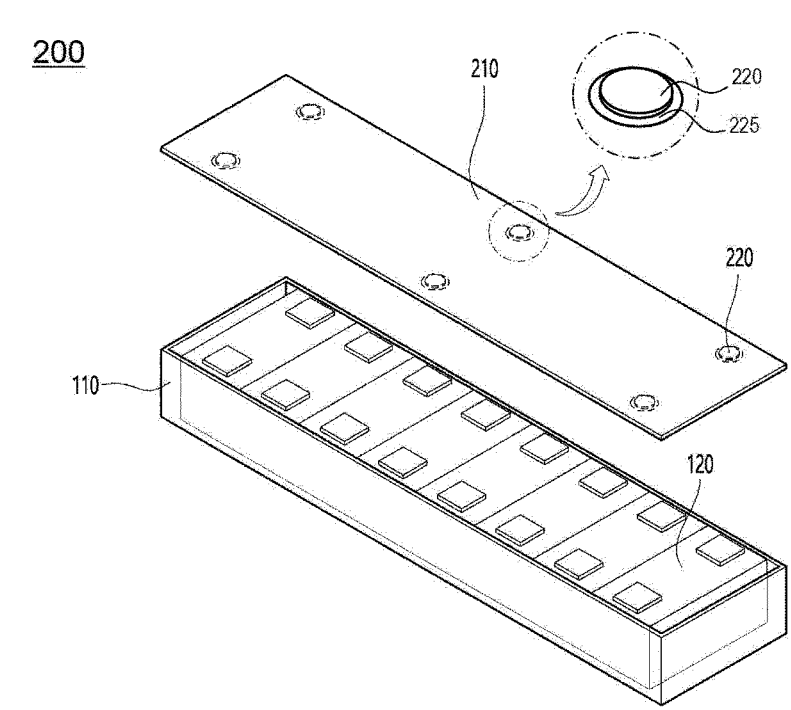
【FIG. 6】
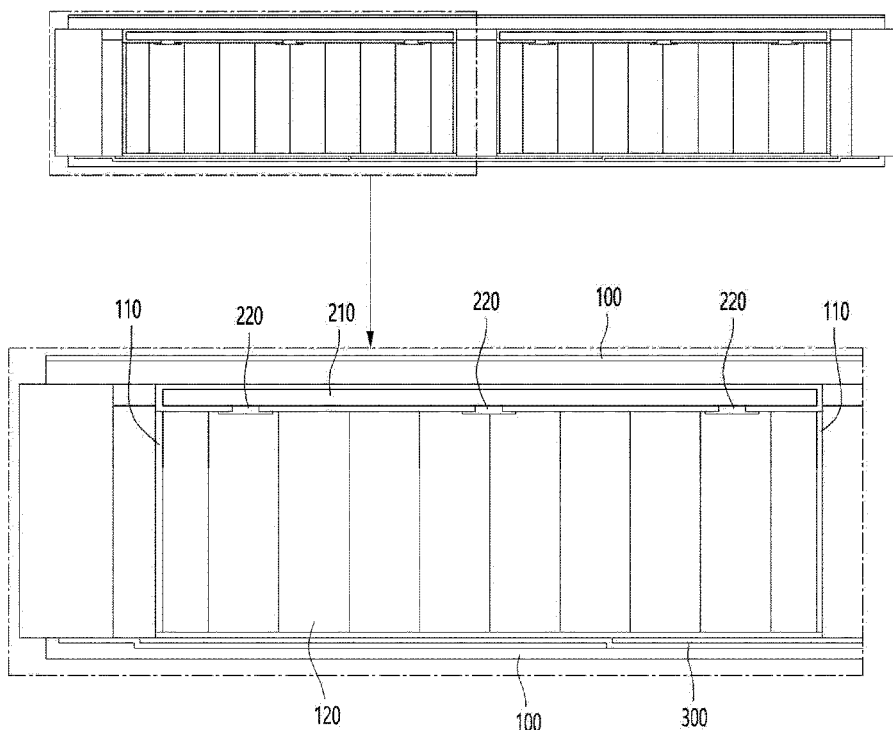

【FIG. 7】
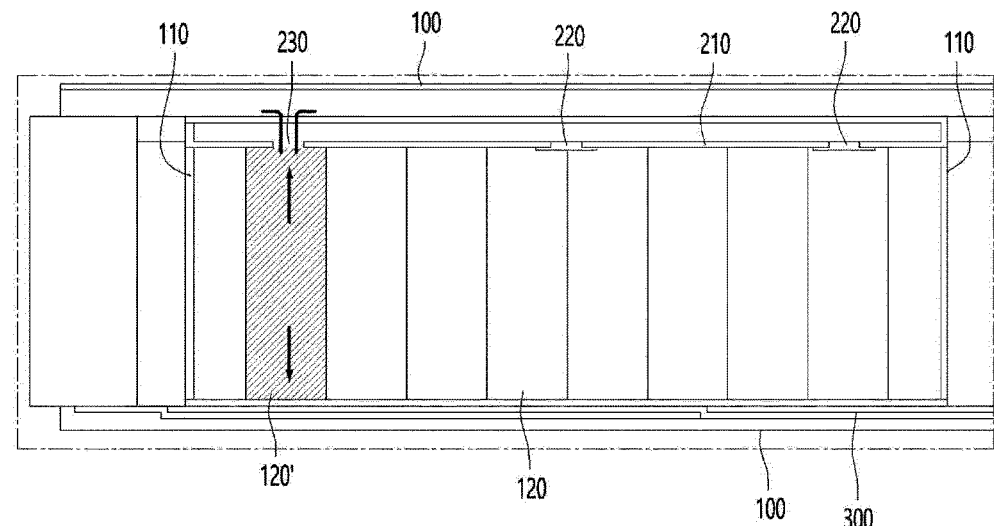
【FIG. 8】
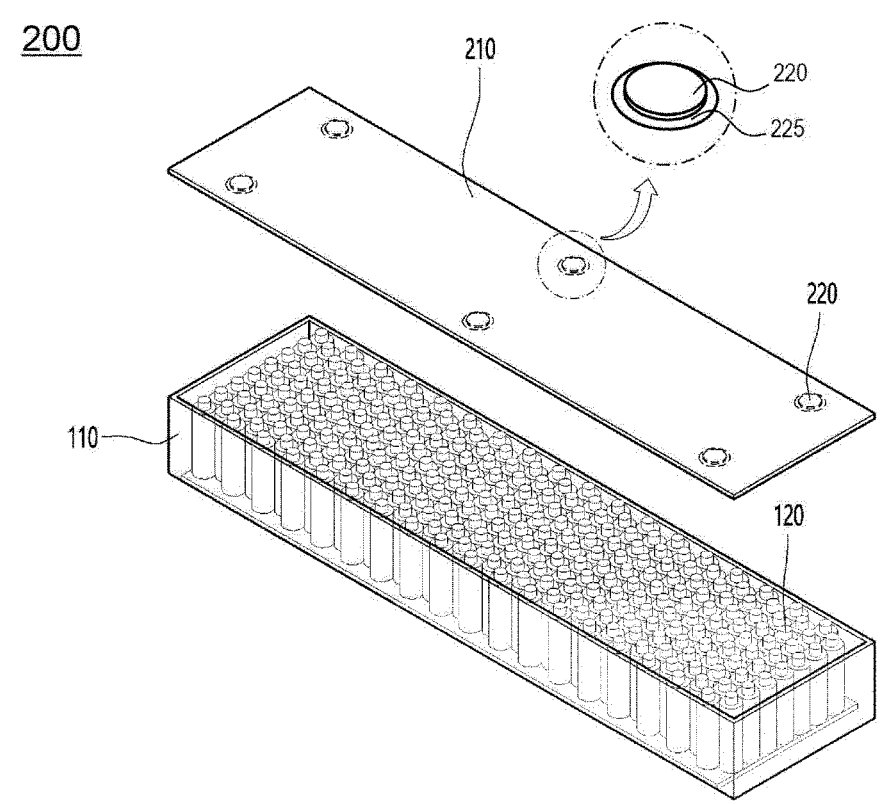

【FIG. 9】
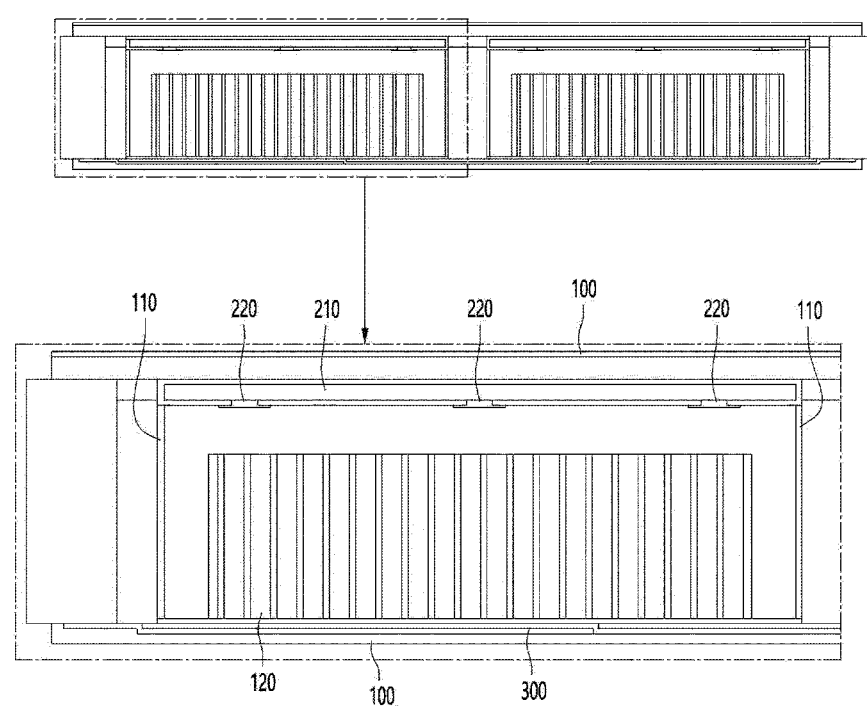
【FIG. 10】
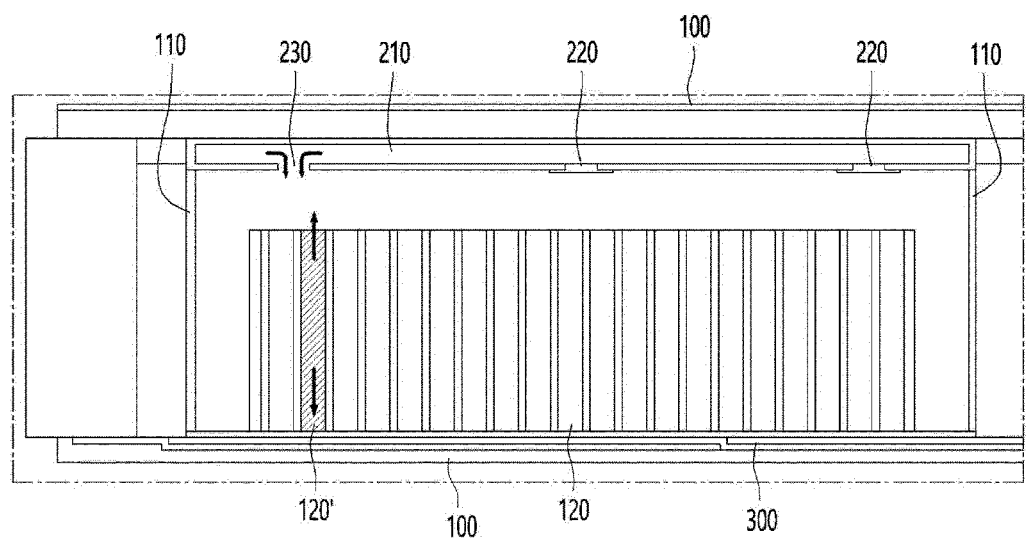

BATTERY PACK INCLUDING THERMAL SPREAD INHIBITION STRUCTURE

TECHNICAL FIELD

This application claims the benefit of priority to Korean Patent Application No. 2020-0157821 filed on Nov. 23, 2020, the disclosure of which is incorporated herein by reference in its entirety.

The present invention relates to a battery pack including a thermal spread inhibition structure. More particularly, the present invention relates to a battery pack including a thermal spread inhibition structure capable of directly injecting a coolant into an ignited battery cell in order to prevent spread of flames of the ignited battery cell in the battery pack.

BACKGROUND ART

As the result of continuous research and development of a lithium secondary battery, it has been possible to manufacture and commercialize a lithium secondary battery having increased capacity and improved output. In addition, demand for the lithium secondary battery as an energy source replaceable fossil fuels, which cause environmental pollution, has increased.

Accordingly, application of the lithium secondary battery to various devices has increased. For example, the lithium secondary battery has been widely used as an energy source for wireless mobile devices, which are small multifunctional products, and wearable devices, which are worn on the body, and has also been used as an energy source for electric vehicles and hybrid electric vehicles presented as alternatives to existing gasoline and diesel vehicles or as an energy storage system (ESS).

As the lithium secondary battery is used as a large-capacity, high-output energy source, as described above, securing safety of the lithium secondary battery becomes an important subject of interest.

Generally, in the case in which fire breaks out in a battery cell received in the energy storage system, a method of injecting water into a battery module or a battery pack through a separate watering device is used.

In this case, however, facilities and space for the watering device are required, and the fire may spread due to a time difference between sensing time of gas discharged due to venting of the battery cell and watering time.

Alternatively, a method of disposing an insulating material or a fire extinguishing agent inside or outside the battery module or the battery pack in order to interrupt heat transfer between battery cells or to cool the ignited battery cell may be used.

In the case in which the insulating material is used, however, a fire extinguishing function is not performed although propagation of flames is interrupted. In the case in which the fire extinguishing agent is used, the fire extinguishing agent is not exactly spread to the point at which fire breaks out, since the fire extinguishing agent is disposed in an empty space in the battery pack in consideration of energy density.

As technology for preventing thermal runaway of the battery pack, Patent Document 1 discloses an apparatus configured such that a bag containing water is located above a battery, the bag is made of a material that has a relatively low melting point, and when the temperature of the battery is increased, the bag is melted and the water in the bag is discharged to the battery.

In Patent Document 1, the entirety of the bag is made of material that has a low melting point. When the temperature of the battery is increased, therefore, the water is not discharged from a specific portion of the bag but the entirety of the water in the bag is discharged while the bag is melted.

In the case in which the bag is disposed so as to be located under the battery cell, therefore, the water cannot be injected into the battery cell, whereby it is not possible to exhibit a fire extinguishing function. Consequently, there is a limitation in that the bag must be used only in a specific direction such that the bag is disposed above the battery cell.

Patent Document 2 is configured such that a middle case and an inner case are received in an outer case, a plurality of cells is received in the middle case, a fire extinguishing agent is received in the inner case, and when the cells generate heat to an upper limit temperature or higher, the fire extinguishing agent is introduced into the middle case through an injection pipe. When the cells generate heat to an upper limit temperature or higher, the injection pipe is opened, whereby the fire extinguishing agent received in the inner case is injected into the middle case.

In Patent Document 2, compressed gas for spraying the fire extinguishing agent, a nozzle used as the injection pipe, and the inner case configured to receive the fire extinguishing agent are included, whereby an additional space therefor is necessary, and expense necessary to purchase the fire extinguishing agent and the compressed gas is also further incurred.

Patent Document 3 discloses a battery module including a cell assembly, a heat sink located so as to abut the outer surface of the cell assembly, the heat sink having formed therein a refrigerant flow path, along which a refrigerant flows, and a thermally shrinkable tube thermally shrunk such that the cell assembly and the heat sink come into tight contact with each other.

In Patent Document 3, the heat sink and the cell assembly are disposed in tight contact with each other, whereby it is possible to obtain a cell assembly heat dissipation effect; however, it is not possible to exhibit a function of preventing spread of flames between adjacent battery modules when fire breaks out in the cell assembly.

Therefore, there is a high necessary for technology capable of minimizing spread of flames and preventing a decrease in energy density without needing an additional space when fire breaks out in a battery cell received in a battery pack.

PRIOR ART DOCUMENTS (Patent Document 1) Japanese Patent Application Publication No. 2014-523622 (2014.09.11)
(Patent Document 2) Japanese Patent Application Publication No. 2012-252909 (2012.12.20)
(Patent Document 3) Korean Patent Application Publication No. 2020-0030964 (2020.03.23)

DISCLOSURE

Technical Problem

The present invention has been made in view of the above problems, and it is an object of the present invention to provide a battery pack including a fire extinguishing and thermal spread inhibition structure capable of extinguishing ignition of a battery cell when the battery cell catches fire or explodes and preventing spread of flames to battery cells adjacent thereto.

Technical Solution

A battery pack according to the present invention to accomplish the above object includes a plurality of battery modules, each battery module configured to receive a plurality of battery cells; a battery pack case configured to receive the plurality of battery modules, and a heat sink located under the plurality of battery modules, wherein each of the plurality of battery modules includes a plurality of battery cells; a water tank located above the plurality of battery cells, and a module case configured to receive the plurality of battery cells and the water tank.

In the battery pack according to the present invention, a flow path configured to guide flow of a coolant introduced into and discharged from the heat sink may be formed in the heat sink.

In the battery pack according to the present invention, the water tank may be mounted integrally to the inside of an upper surface of the module case.

In the battery pack according to the present invention, an upper part of the module case is open, and the water tank may be coupled to the module case so as to cover the open upper part of the module case.

In the battery pack according to the present invention, a through-hole may be formed in a first surface of the water tank that faces the plurality of battery cells, and a sealing member may be added to the through-hole.

In the battery pack according to the present invention, the sealing member may be made of a material that is melted by high-temperature gas or sparks discharged from a battery module of the plurality of battery modules.

In the battery pack according to the present invention, the through-hole may be opened as the result of melting of the sealing member, and a coolant received in the water tank may be introduced into a battery module of the plurality of battery modules through the through-hole.

In the battery pack according to the present invention, the through-hole may be a plurality of holes is formed in a first surface of the water tank so as to be uniformly dispersed.

In the battery pack according to the present invention, a partition wall may be added between the plurality of battery modules.

In the battery pack according to the present invention, the through-hole may be filled with the sealing member, and the sealing member may include an extension portion having a width greater than the circumference of the through-hole.

In the battery pack according to the present invention, each of the plurality of battery cells may be a pouch-shaped battery cell, a prismatic battery cell, or a cylindrical battery cell.

Advantageous Effects

As is apparent from the above description, a battery pack according to the present invention has a water tank disposed therein, whereby it is possible to rapidly cool an ignited battery cell without increasing the external size of the battery pack, and therefore it is possible to securely inhibit a thermal runaway phenomenon of the battery cell.

In addition, a sealing member is added to one surface of the water tank that faces battery cells. When the sealing member is removed as the result of melting, it is possible to spray a coolant toward the ignited battery cell irrespective of the position or orientation of the battery pack.

In addition, a through-hole is formed in one surface of the water tank, and the through-hole is filled with the sealing member, whereby it is possible to minimize an increase in weight of the battery pack due to addition of the sealing member.

In addition, even though fire breaks out in any one of battery cells constituting a battery cell stack, it is possible to exactly inject the coolant into the ignited battery cell. Even when the present invention is applied to a large-capacity battery pack, therefore, it is possible to obtain a thermal spread interruption effect.

Also, in the case in which water is used instead of a fire extinguishing agent, it is possible to reduce production cost.

DESCRIPTION OF DRAWINGS

FIG. 1 is a perspective view of a battery pack according to a first embodiment of the present invention.

FIG. 2 is an exploded perspective view of the battery module according to a first embodiment.

FIG. 3 is a sectional view of the battery pack taken along line A-A' of FIG. 1.

FIG. 4 is a schematic view illustrating a situation in which flames are extinguished when fire breaks out in the battery pack according to the first embodiment.

FIG. 5 is an exploded perspective view of a battery module according to a second embodiment.

FIG. 6 is a sectional view of a battery pack according to a second embodiment.

FIG. 7 is a schematic view illustrating a situation in which flames are extinguished when fire breaks out in the battery pack according to the second embodiment.

FIG. 8 is an exploded perspective view of a battery module according to a third embodiment.

FIG. 9 is a sectional view of a battery pack according to a third embodiment.

FIG. 10 is a schematic view illustrating a situation in which flames are extinguished when fire breaks out in the battery pack according to the third embodiment.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

Embodiments of the present invention will be described in detail with reference to the accompanying drawings.

FIG. 1 is a perspective view of a battery pack according to a first embodiment of the present invention, FIG. 2 is an exploded perspective view of the battery module according to a first embodiment, and FIG. 3 is a sectional view of the battery pack taken along line A-A' of FIG. 1.

Referring to FIGS. 1 to 3, the battery pack according to the present invention includes a battery module 200 configured to receive a plurality of battery cells 120, a battery pack case 100 configured to receive two or more battery modules 200, and a heat sink 300 located under the battery modules 200, wherein each of the battery modules 200 includes a plurality of battery cells 120, a water tank 210 located above the plurality of battery cells 120, and a module case 110 configured to receive the plurality of battery cells 120 and the water tank 210.

A through-hole is formed in the lower surface of the water tank 210. A sealing member 220 is added to the through-hole in order to prevent discharge of a coolant through the through-hole when the battery pack is in a normal state. Since the sealing member 220 is added to the lower surface of the water tank, the sealing member is not visible from outside of the battery pack. For the convenience of description, however, the sealing member 220 is shown with a dotted line in FIG. 2.

In a concrete example, each of the plurality of battery cells 120 may be a pouch-shaped battery cell, and the bottoms of electrode assembly receiving portions are disposed so as to be perpendicular to the ground in the state in which the pouch-shaped battery cells are stacked such that the electrode assembly receiving portions are in tight contact with each other.

The pouch-shaped battery cell may be a bidirectional battery cell having a positive electrode lead and a negative electrode lead protruding in opposite directions or a unidirectional battery cell having a positive electrode lead and a negative electrode lead protruding in the same direction.

The module case 110 may be configured to wrap opposite ends of a battery cell stack, in which the bottoms of electrode assembly receiving portions are disposed so as to be perpendicular to the ground, parallel to the bottoms of the electrode assembly receiving portions and to wrap the upper surface and the lower surface of the battery cell stack.

In the module case 110, the water tank 210 is disposed above the battery cell stack. The battery cell stack and the water tank 210 may be disposed so as to be adjacent to each other, or the battery cell stack and the water tank may be disposed so as to be spaced apart from each other.

The water tank 210 may be mounted integrally to the upper surface of the module case 110, and the water tank 210 may be the upper surface of the module case 110.

In another embodiment, the module case 110 may be configured in a U shape in order to wrap the opposite ends of the battery cell stack parallel to the bottoms of the electrode assembly receiving portions and the lower surface of the battery cell stack.

Alternatively, the module case 110 may be a box open at the upper part thereof configured to wrap the other surfaces of the battery cell stack excluding the upper surface, and the water tank 210 may be coupled to the module case 110 so as to cover the open upper surface of the module case 110.

That is, the water tank 210 is disposed at the upper surface of the battery cell stack, and therefore the water tank may serve as a cover of the module case 110 having the open upper surface.

The water tank 210 is formed in a rectangular parallelepiped shape in which the lower surface of the water tank that faces the module case 110 and the upper surface of the water tank, which is opposite the lower surface, are wide, and the area of each of the upper surface and the lower surface has a size that covers the upper surfaces of the plurality of battery cells 120 received in the module case 110.

The battery pack according to the present invention includes a plurality of water tanks 210, each of which is configured to have a size that is mounted in the module case. In the case in which fire breaks out in a battery cell included in a specific battery module, therefore, the fire can be extinguished by the water tank included in the battery module.

Consequently, it is possible to prevent thermal spread to battery modules adjacent thereto and to replace only the battery module including the ignited battery cell.

A through-hole is formed in the lower surface of the water tank 210 according to the present invention. A sealing member 220 is added to the through-hole in order to prevent discharge of the coolant through the through-hole when the battery pack is in a normal state.

A flow path configured to guide flow of the coolant introduced into and discharged from the heat sink is formed in the heat sink 300, and the temperature of the coolant introduced into and discharged from the heat sink 300 may be maintained at a predetermined level. Even though heat is generated in the battery cell 120 due to repeated charging and discharging of a lithium secondary battery, therefore, it is possible to inhibit an increase in overall temperature of the battery pack.

During repeated charging and discharging of the battery cell 120, the electrode assembly is expanded and contracted, and gas is generated as a byproduct of charging and discharging. As a result, the module case may swell. A partition wall 101 may be added between one module case 110 and another module case 110 in order to minimize the effect of swelling of one module case 110 on module cases adjacent thereto and to fix and support the module cases 110.

FIG. 4 is a schematic view illustrating a situation in which flames are extinguished when fire breaks out in the battery pack according to the first embodiment.

Referring to FIGS. 3 and 4, a plurality of module cases 110 is disposed in the battery pack case 100, a plurality of battery cells 120 is disposed in each module case 110, and the water tank 210 is disposed above the plurality of battery cells 120, and the interior of the water tank 210 is filled with a coolant configured to lower the temperature of a heated or ignited battery cell.

A through-hole is formed in one surface of the water tank 210 that faces the plurality of battery cells 120, and a sealing member 220 is added to the through-hole in order to hermetically seal the through-hole. The sealing member 220 is made of a material that is melted by high-temperature gas or sparks discharged from the battery cell 120. That is, when the battery cell 120 is in a normal state, the state in which the through-hole is hermetically sealed by the sealing member 220 is maintained. However, when the temperature of an ignited battery cell, e.g. a battery cell 120', is increased and flames are generated and spread to a sealing member located adjacent thereto, the sealing member 220, which has a low melting point, is melted, whereby the through-hole 230 is opened. Consequently, the coolant in the water tank 210 may be directly introduced into the battery cell.

The coolant received in the water tank 210 is evaporated by fire outbreak in the battery cell, whereby the volume of the coolant is increased and thus the coolant is transformed into a high pressure state. When the through-hole 230 is opened, therefore, the coolant may be sprayed toward the ignited battery cell at a high pressure.

At this time, the shape of the sealing member 220 that is not adjacent to the ignited battery cell 120' may be maintained without melting. Consequently, the coolant may be ejected through only the through-hole from which the sealing member has been removed.

In consideration of the fact that the coolant is directly injected into the pouch-shaped battery cell, it is necessary to prevent flames of the pouch-shaped battery cell from expanding or to prevent explosion of the pouch-shaped battery cell due to injection of the coolant. Consequently, it is preferable for no combustible material to be used as an additive included in the coolant. Alternatively, in the case in which a combustible material is used as the additive, the additive may be added in an amount sufficient to prevent secondary explosion of the pouch-shaped battery cell and in such an amount that the additive is used as an antifreeze solution in order to prevent freezing of the coolant.

The sealing member may be made of a thermoplastic polymer resin having a melting point of about 200° C. or less. For example, a material having a melting point of about 100° C. to about 200° C., such as polyethylene or polypropylene, may be used as the thermoplastic polymer resin.

The through-hole is filled with the sealing member 220 of FIG. 2, and the sealing member may include an extension portion 225 further extending outwards from the outer surface of the water tank than the circumference of the through-hole. The extension portion 225 is a portion that further extends from the outer surface of the water tank. In a normal state, the extension portion may increase the force of coupling between the water tank and the sealing member 220. When fire breaks out in the battery cell, the extension portion and the sealing member may be sequentially melted as the result of temperature rise, whereby the through-hole may be opened.

When a battery cell constituted by a lithium secondary battery is defective, overcharged, or overheated, a thermal runaway phenomenon occurs in the battery cell. When the battery cell is in a thermal runaway state, the temperature of the battery cell may rise up to a temperature at which gas venting occurs, e.g. about 260° C. In addition, the temperature of the battery cell may be continuously increased while gas venting occurs.

In the case in which a plurality of battery cells is received in a battery pack case to manufacture a battery pack, when one battery cell is in a thermal runaway state, heat and flames may be transferred to a battery cell adjacent thereto, whereby the adjacent battery cell may be overheated and may thus be in a thermal runaway state. The battery cell in the thermal runaway state may heat a battery cell adjacent thereto, whereby a thermal runaway chain reaction may occur. When a battery cell in a thermal runaway state is present in the battery pack case, therefore, thermal runaway of a plurality of battery cells may occur, and this may spread more widely, whereby great damage may be caused. In the case in which a plurality of battery cells is in a thermal runaway state, the battery cells may reach a temperature of about 1000° C. or higher, and this temperature is maintained until the battery cells are completely destroyed by fire, whereby a user may be in danger.

Consequently, it is very important to extinguish the ignited battery cell before flames and heat of the ignited battery cell spread to a battery cell adjacent thereto.

In the battery pack according to the present invention, therefore, the water tank 210 containing the coolant is provided at a position adjacent to the upper parts of the module cases 110, and the through-hole, through which the coolant flows out, is hermetically sealed by the sealing member having a low melting point. When the sealing member 220 is melted by an ignited battery cell, therefore, the through-hole 230 is opened. Consequently, the coolant received in the water tank 210 is directly introduced into the battery cell 120 through the through-hole. The overheated or ignited pouch-shaped battery cell is rapidly extinguished or cooled through the above process, whereby it is possible to rapidly prevent spread of thermal runaway, and therefore it is possible to secure time necessary to extinguish flames of the battery cell using a watering facility located at the outside.

In addition, even though the battery pack according to the present invention is mounted at a position close to a user, e.g. in an electric vehicle, it is possible to rapidly extinguish flames of the battery cell, and therefore it is possible to secure user safety.

The through-hole 230 formed in the water tank 210 may be configured to have a structure in which a plurality of holes is formed in one surface of the water tank so as to be uniformly dispersed. Even though fire breaks out in a certain battery cell, therefore, a sealing member located so as to be adjacent thereto may be melted. Even though fire breaks out in a battery cell located at a certain position, therefore, the coolant may be directly injected into the ignited battery cell irrespective of the position of the battery cell. That is, the number of through-holes formed in the water tank may be set in consideration of the size and number of module cases and the shape, size, and number of battery cells disposed in the module case.

FIG. 5 is an exploded perspective view of a battery module according to a second embodiment, FIG. 6 is a sectional view of a battery pack according to a second embodiment, and FIG. 7 is a schematic view illustrating a situation in which flames are extinguished when fire breaks out in the battery pack according to the second embodiment.

Referring to FIGS. 5 to 7, the battery pack includes a battery module 200 configured to receive a plurality of battery cells 120, a battery pack case 100 configured to receive two or more battery modules 200, and a heat sink 300 located under the battery modules 200, wherein each of the battery modules 200 includes a plurality of battery cells 120, a water tank 210 located above the plurality of battery cells 120, and a module case 110 configured to receive the plurality of battery cells 120 and the water tank 210.

Each of the plurality of battery cells 120 is a prismatic battery cell that is generally configured to have a hexahedral structure and that has an electrode assembly received in a battery case made of a metal material, wherein a positive electrode terminal and a negative electrode terminal may protrude from the upper surface of the prismatic battery cell so as to face the water tank 210. The prismatic battery cells may be disposed in tight contact with each other such that relatively wide side surfaces of the prismatic battery cells are stacked so as to be adjacent to each other.

In addition, a through-hole is formed in one surface of the water tank 210 that faces the plurality of battery cells, and a sealing member 220 made of a material that has a low melting point is added to the through-hole. When fire breaks out in the battery cell, the sealing member may be melted to open the through-hole, and the coolant received in the water tank may be directly introduced into the battery cell 120 through the through-hole.

In addition thereto, the description of the battery pack according to the first embodiment is equally applicable to the battery pack according to the second embodiment. In addition, the same components of the second embodiment as the first embodiment may be denoted by the same reference numerals.

FIG. 8 is an exploded perspective view of a battery module according to a third embodiment, FIG. 9 is a sectional view of a battery pack according to a third embodiment, and FIG. 10 is a schematic view illustrating a situation in which flames are extinguished when fire breaks out in the battery pack according to the third embodiment.

Referring to FIGS. 8 to 10, the battery pack includes a battery module 200 configured to receive a plurality of battery cells 120, a battery pack case 100 configured to receive two or more battery modules 200, and a heat sink 300 located under the battery modules 200, wherein each of the battery modules 200 includes a plurality of battery cells 120, a water tank 210 located above the plurality of battery cells 120, and a module case 110 configured to receive the plurality of battery cells 120 and the water tank 210.

Each of the plurality of battery cells 120 is a cylindrical battery cell that is generally configured to have a cylindrical structure and that has an electrode assembly received in a battery case made of a metal material, wherein a positive electrode terminal may protrude upwards so as to face the water tank 210.

In addition, a through-hole is formed in one surface of the water tank 210 that faces the plurality of battery cells, and a sealing member 220 made of a material that has a low melting point is added to the through-hole. When fire breaks out in the battery cell, the sealing member may be melted to open the through-hole, and the coolant received in the water tank may be directly introduced into the battery cell 120 through the through-hole.

In addition thereto, the description of the battery pack according to the first embodiment is equally applicable to the battery pack according to the third embodiment. In addition, the same components of the third embodiment as the first embodiment may be denoted by the same reference numerals.

Those skilled in the art to which the present invention pertains will appreciate that various applications and modifications are possible within the category of the present invention based on the above description.

DESCRIPTION OF REFERENCE NUMERALS

100: Battery pack case
101: Partition wall
110: Module case
120, 120': Battery cells
200: Battery module
210: Water tank
220: Sealing member
225: Extension portion

230: Through-hole
300: Heat sink

The invention claimed is:

1. A battery pack comprising:
a plurality of battery modules;
a battery pack case configured to receive the plurality of battery modules; and
a heat sink located under the plurality of battery modules, wherein each of the plurality of battery modules comprises:
a plurality of battery cells;
a water tank located above the plurality of battery cells, the water tank including a through-hole that is located in a first surface of the water tank that faces the plurality of battery cells;
a module case configured to receive the plurality of battery cells and the water tank; and
a sealing member located in the through-hole, the sealing member having a largest width at a portion located closest to the plurality of battery cells.

2. The battery pack according to claim 1, wherein a flow path configured to guide flow of a coolant introduced into and discharged from the heat sink is formed in the heat sink.

3. The battery pack according to claim 1, wherein the water tank is mounted integrally to an inside of an upper surface of the module case.

4. The battery pack according to claim 1, wherein an upper part of the module case is open, and
wherein the water tank is coupled to the module case so as to cover the open upper part of the module case.

5. The battery pack according to claim 1, wherein the sealing member is made of a material that is melted by high-temperature gas or sparks discharged from a battery module of the plurality of battery modules.

6. The battery pack according to claim 5, wherein the through-hole is opened as a result of melting of the sealing member, and
wherein a coolant received in the water tank is introduced into a battery module of the plurality of battery modules through the through-hole.

7. The battery pack according to claim 1, wherein the through-hole is a plurality of holes in the first surface of the water tank so as to be uniformly dispersed.

8. The battery pack according to claim 1, wherein a partition wall is added between the plurality of battery modules.

9. The battery pack according to claim 1, wherein the through-hole is filled with the sealing member, and
wherein the sealing member comprises an extension portion having a width greater than a circumference of the through-hole.

10. The battery pack according to claim 9, wherein the extension portion is the portion located closest to the plurality of battery cells.

11. The battery pack according to claim 9, wherein the extension portion contacts a lower surface of the water tank underneath the through-hole.

12. The battery pack according to claim 9, wherein the extension portion forms a flat surface with a lower surface of the sealing member.

13. The battery pack according to claim 1, wherein each of the plurality of battery cells is a pouch-shaped battery cell, a prismatic battery cell, or a cylindrical battery cell.

14. The battery pack according to claim 1, wherein a circumference of the through-hole has a uniform length.

* * * * *